United States Patent
Dicken et al.

(10) Patent No.: US 7,581,957 B2
(45) Date of Patent: *Sep. 1, 2009

(54) MULTIPLATFORM VOICE OVER IP LEARNING DEPLOYMENT METHODOLOGY

(75) Inventors: Asieh Dicken, Indianapolis, IN (US); Margaret A. Strong, Newnan, GA (US); Marcy L. Wagman, Wappingers Falls, NY (US); Albert T. Wong, Hacienda Heights, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 11/926,305

(22) Filed: Oct. 29, 2007

(65) Prior Publication Data

US 2008/0076104 A1    Mar. 27, 2008

Related U.S. Application Data

(63) Continuation of application No. 10/936,960, filed on Sep. 9, 2004.

(51) Int. Cl.
*G09B 3/00* (2006.01)
(52) U.S. Cl. .................. 434/322; 434/350; 434/319
(58) Field of Classification Search .............. 434/319, 434/322, 350
See application file for complete search history.

(56) References Cited

U.S. PATENT DOCUMENTS

| | | | |
|---|---|---|---|
| 6,142,784 | A | 11/2000 | Wood |
| 6,595,781 | B2 | 7/2003 | Sutton |
| 6,607,136 | B1 | 8/2003 | Atsmon et al. |
| 6,988,138 | B1 * | 1/2006 | Alcorn et al. ............ 709/225 |
| 7,237,017 | B1 | 6/2007 | Pecus et al. |
| 2002/0194587 | A1 | 12/2002 | Lampton et al. |
| 2003/0003433 | A1 | 1/2003 | Carpenter et al. |
| 2003/0154073 | A1 | 8/2003 | Ota et al. |
| 2003/0158957 | A1 | 8/2003 | Abdolsalehi |
| 2004/0013252 | A1 | 1/2004 | Craner |
| 2004/0111748 | A1 | 6/2004 | Bushey et al. |
| 2005/0221268 | A1 | 10/2005 | Chaar et al. |

OTHER PUBLICATIONS

V. B. Weigel, "Deep Learning for a Digital Age", Student Affairs Online, vol. 3, No. 4; Fall 2002.

B. S. Bloom, et al., "The Affective Domain & The Cognitive Domain", Taxonomy of Educational Objectives, New York (1964).

(Continued)

*Primary Examiner*—Cameron Saadat
(74) *Attorney, Agent, or Firm*—Scully, Scott, Murphy & Presser, P.C.; John Pivnichny

(57) ABSTRACT

Disclosed are a learning system and method for auditory learners. The system comprises recording means for capturing, digitizing, storing, and indexing voice statements; and means for allowing an auditory learner to search said indexing for desirable voice statements. The learning system further comprises means for playing on demand and broadcasting said desired voice statements to said auditory learner; means for creating an auditory live session for said learner; and means for mining said voice statements for emerging subject matter and to create new voice statements for playing on demand to said learner. The preferred embodiment of the invention is a new deployment vehicle for informal learning cultivated within a Community of Practice and broadcast over IP.

9 Claims, 1 Drawing Sheet

OTHER PUBLICATIONS

D. A. Kolb, "David A. Kolb on Experiential Learning", http://www.infed.org/biblio/b-explrn.htm; pp. 1-12; 2004.
David A. Kolb, "VAK Learning Styles"; and.
H. E. Gardner, "Instructional-Design Theories and Models—A New Paradigm of Instructional Theory", Lawrence Erlbaum Associates, Publishers, Mahwah, New Jersey and London; 1999, edited by C.M. Reigeluth, Chapter 4, "Multiple Approaches to Understanding", Howard Gardner, 1997, pp. 69-88.

* cited by examiner

MULTIPLATFORM VOICE OVER IP LEARNING DEPLOYMENT METHODOLOGY

CROSS REFERENCE TO RELATED APPLICATIONS:

The present application is a continuation application of co-pending application Ser. No. 10/936,960, filed Sep. 9, 2004.

BACKGROUND OF THE INVENTION

1. Field of the Invention

This invention generally relates to learning systems, and more specifically, the invention relates to a system for auditory learners. Even more specifically, the invention, in its preferred form, relates to a multiplatform voice over IP learning deployment methodology to disseminate community-based informal learning for auditory learners.

2. Background Art

Communities of practice are not being tapped for immergent knowledge early in the knowledge lifecycle. In the present learning development model, development of learning opportunities does not occur until later in the knowledge lifecycle, when they become expensive to produce, deploy, and maintain (often beyond their lifespan).

Communities of practice provide a natural opportunity to develop and disseminate informal knowledge. Only about 20% of formal learning relates to what people do on their jobs; yet about 80% of learning dollars are spent on this formal knowledge design and delivery. An area called informal learning is ripe for investigation for new learning deployments.

Currently, voice over IP is being used for knowledge dissemination at the Knowledge level of Bloom's taxonomy, but only to carry the verbal portion of web casts that are accompanied by presentations. Using the framework of learning motivation strategies, auditory learning styles theory, cognitive multi-tasking learning ability theory, on demand technologies, and cost effectiveness, voice over IP can be positioned as an effective vehicle to carry learning to the comprehension, application, analysis, syntheses and evaluation levels of learning.

SUMMARY OF THE INVENTION

An object of this invention is to improve systems and procedures for auditory learning.

Another object of the invention is to provide a learning model based on existing or open source technology which is upheld by instructional design methodologies that support auditory learning.

A further object of the present invention is to provide a deployment vehicle for informal learning cultivated within a Community of Practice and broadcast over IP.

These and other objectives are attained with a learning system for auditory learners, comprising recording means for capturing, digitizing, storing, and indexing voice statements; and means for allowing an auditory learner to search said indexing for desirable voice statements. The learning system further comprises means for playing on demand and broadcasting said desired voice statements to said auditory learner; means for creating an auditory live session for said learner; and means for mining said voice statements for emerging subject matter and to create new voice statements for playing on demand to said learner.

The preferred embodiment of the invention is a new deployment vehicle for informal learning cultivated within a Community of Practice and broadcast over IP. The invention can be expanded to provide a venue for subject matter experts, the creative arts (as a motivator and outlet for multi-dimensional skill sets), and recycling of the prolific numbers of Web casts created and conducted in, for example, a large corporation.

Further benefits and advantages of the invention will become apparent from a consideration of the following detailed description, given with reference to the accompanying drawing, which specifies and shows preferred embodiments of the invention.

DETAILED DESCRIPTION OF THE PREFERRED EMBODIMENTS

Figure 1:
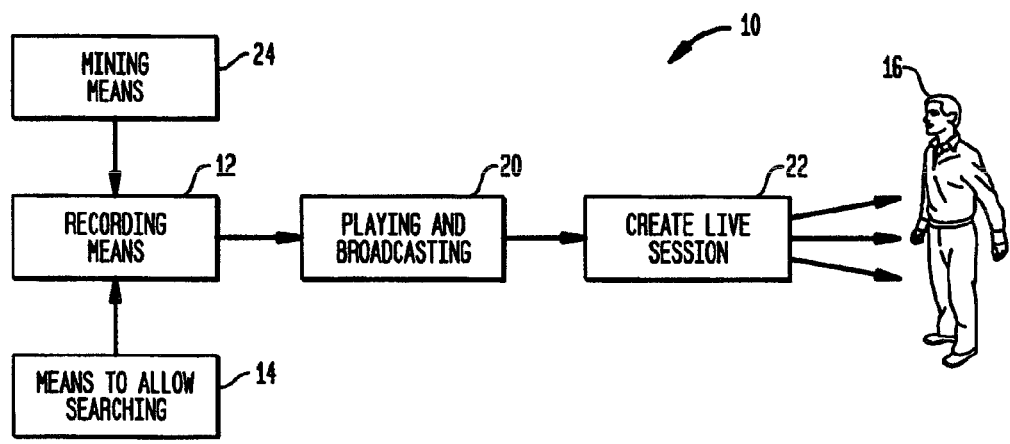
FIG. 1 schematically illustrates a learning system embodying this invention.

The present invention relates to a learning system for auditory learners, and FIG. 1 schematically illustrates a learning system 10 embodying the invention. Generally, system 10 comprises recording means 12 for capturing, digitizing, storing, and indexing voice statements; and means 14 for allowing an auditory learner, represented at 16, to search said indexing for desirable voice statements. System 10 also comprises means 20 for playing on demand and broadcasting said desired voice statements to said auditory learner; means 22 for creating an auditory live session for said leaner 16; and means 24 for mining said voice statements for emerging subject matter and for creating new voice statements for playing on demand to said learner.

With a preferred embodiment of the invention, in order to learn, people tune into a Web cast for informal passive learning. The appropriate software may already be installed in the workstation. Live Web cast announcers, referred to as DJs, rotate around the world as people are at work. For example, 8 am to 5 pm Eastern Standard Time, may have DJs from the Americas, followed by DJs from the Asian-Pacific regions and then from the Eastern/Middle East regions.

The DJs may be selected by a designated team based on any suitable criteria. The Web cast topics may be business related subjects, such as education, communications and/or discussions.

Submissions may incorporate auditory instructional design techniques that will drive knowledge past the knowledge and comprehension levels. Programming may be designed to establish predictable curricula, highlight business focus, and create an alternative motivational medium for practitioners to exhibit their work-related enablements, colored by the unique creative contributions of independent artists.

The present invention surpasses previous deployments of voice over IP because it employs on demand, cross platform, and focused instructional design strategies as deployments that take two forms—live broadcast, and on-demand broadcast.

This invention fits the on-demand model because a learner can choose to reflect and re-listen at any time, choose informal learning as a "just-in-time" opportunity, or choose to join a live discussion with human interaction at a multi sensory level. For instance, a voice over IP discussion might result in a video conference, meeting, or other formal learning event.

Also, for example, the invention can be expanded for wireless delivery, or may serve as a "same path" learning delivery to meet accessibility requirements, possibly coupled with voice recognition for an enhanced solution.

The present invention may be implemented in a very cost effective manner because the costs to implement the invention do not need to be substantial. Perhaps the only principal continuing cost is for a program manager, and even this does not require a full time employee. It is estimated, for instance, that the invention may require a program manager for no more than ten hours a week. Other costs may include developers for the Website, servers and administrators. It is believed that the DJs may be volunteers. A suitable broadcast server can be provided at about $5,000 per year. Other, one time costs may include education/guide for the DJs, and workshops for writing and programming the Web casts.

As a replay medium for one-off Web meetings, the present invention fills a solution and deployment void that is expressed as a critical element of cognitive reinforcement learning theory and other theories described by Gardner, Kolb and others. Very little opportunity for reflective and synthesis as a delayed follow-up to a learning event is now available, as a solution; and those that do exist are usually expensive, one-off, facilitator led meetings or emeetings.

Over time, various metrics may be used to measure the effectiveness of the invention, or any specific implementation of the invention. These metrics may include, as examples, the number of listeners, the range of topics (which may be considered as the curriculum), and the extent to which the invention may be aligned with key plays. Other effectiveness measurement systems may be used.

Figure 2:
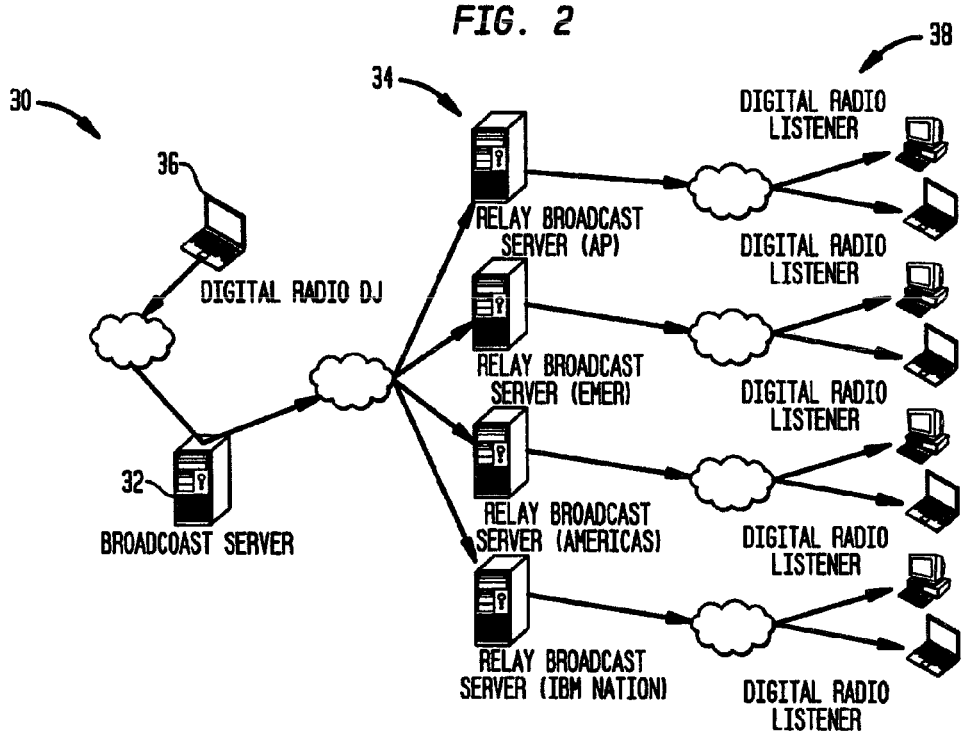
FIG. 2 shows an infrastructure architecture that may be used in the practice of the present invention.

FIG. 2 illustrates an infrastructure architecture 30 that may be used in the practice of this invention. This architecture includes a broadcast server 32, and a series of relay broadcast servers 34. FIG. 2 also shows a laptop or notebook computer 36 for use by a DJ to transmit a webcast to server 32, and a series of workstations 38 for use by listeners to receive the broadcasts from servers 34.

In order to better utilize the resources used in the invention, anyone may be allowed to relay the broadcasts. This will create geographically disperse relay listener servers to lower telecommunication costs, and the broadcast provider only needs to manage the broadcast server. Also, preferably there are several channels to listen to. These channels may be used to broadcast, for example, a live broadcast, a live discussion, relays from community of practice lecture series, and live events.

The present invention fills a significant void. Specifically, at the present time, there is no theater that cost effectively replays Web casts, creates custom programming that can loop over time to different geographies, and provides a single place where those interested can tune into channels to listen to or participate in informal learning.

As indicated hereinabove, it should be understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A learning system for auditory learners, comprising:
   a broadcast server computer executing a computer program stored in a computer-readable medium to perform the steps of
   i) capturing, digitizing, storing, and indexing voice statements to establish predictable curricula, highlight business focus, and create an alternative motivational medium for practitioners to exhibit their work related enablements, including creative contributions of artists;
   ii) allowing an auditory learner to search said indexing for desirable voice statements;
   iii) playing on demand and broadcasting said desired voice statements to said auditory learner;
   iv) creating an auditory live session for said learner including joining a live discussion with human interaction at a multi-sensory level, coupled with voice recognition; and
   v) mining said voice statements for emerging subject matter and to create new voice statements for playing, via wireless delivery, on demand to said learner;
   vi) measuring the effectiveness of the learning system as measured by the number of listeners and the range of topics; and
   vii) providing several channels for users to listen to and to participate in learning, said several channels being used to broadcast a live broadcast, a live discussion, relays from community of practice lecture series, and live events;
   a learner workstation for receiving said desired voice statements, including tuning into a web cast for informal passive learning, and resulting in a video conference and meeting;
   operators for operating the system, and wherein the location of the operators rotates around the world each day; and
   geographically dispersed relay listener sewers to relay voice statements from the broadcast server computer.

2. A system according to Claim 1, wherein the broadcast server is further configured for broadcasting said desired voice statements over the Internet.

3. A system according to claim 1, wherein the broadcast server is further configured for broadcasting said desired voice statements over the Internet.

4. A learning method for auditory learners, comprising:
   capturing, digitizing, storing, and indexing voice statements on a recording medium;
   allowing an auditory learner to search said indexing for desirable voice statements to establish curricula, highlight business focus, and create an alternative motivational medium for practitioners to exhibit their work related enablements, including creative contributions of artists;
   playing on demand and broadcasting said desired voice statements from a broadcast server continuously over a period of days to said auditory learner;
   creating an auditory live session for said learner including joining a live discussion with human interaction at a multi-sensory level, coupled with voice recognition; and mining said voice statements for emerging subject mailer and to create new voice statements for playing, via wireless delivery, on demand to said learner;

measuring the effectiveness of the learning method as measured by the number of listeners, and the range of topics;

providing several channels for users to listen to and to participate in learning, said several channels being used to broadcast a live broadcast, a live discussion relays from community of practice lecture series, and live events;

receiving said desired voice statements in a learner workstation, including tuning into a web cast for informal passive learning, and resulting in a video conference and meeting;

using operators for operating the learning method, and rotating the location of the operators around the world each day; and using geographically dispersed relay listener servers to relay voice statements from the broadcast server.

5. A method according to claim 4, wherein the step of playing and broadcasting includes the step of broadcasting said desired voice statements over the Internet.

6. A method according to claim 4, wherein the step of playing and broadcasting includes the step of using a broadcast server for broadcasting said desired voice statements over the Internet.

7. A program storage device readable by machine, tangibly embodying a program of instructions executable by the machine to perform method steps to provide a learning method for auditory learners, the method steps comprising:

capturing, digitizing, storing, and indexing voice statements on a recording medium;

allowing an auditory learner to search said indexing for desirable voice statements to establish predictable curricula, highlight business focus, and create an alternative motivational medium for practitioners to exhibit their work related enablements, including creative contributions of artists;

playing on demand and broadcasting said desired voice statements from a broadcast server continuously over a period of days to said auditory learner;

creating an auditory live session for said learner including joining a live discussion with human interaction at a multi-sensory level, coupled with voice recognition; and mining said voice statements for emerging subject matter and to create new voice statements for playing, via wireless delivery, on demand to said learner;

measuring the effectiveness of the learning method as measured by the number of listeners, and the range of topics;

providing several channels for users to listen to and to participate in learning, said several channels being used to broadcast a live broadcast, a live discussion relays from community of practice lecture series, and live events;

receiving said desired voice statements in a learner workstation, including tuning into a web cast for informal passive learning, and resulting in a video conference and meeting;

using operators for operating the learning method, and rotating the location of the operators around the world each day; and using geographically dispersed relay listener servers to relay voice statements from the broadcast server.

8. A program storage device according to claim 7, wherein the step of playing and broadcasting includes the step of broadcasting said desired voice statements over the Internet.

9. A program storage device according to claim 7, wherein the step of playing and broadcasting includes the step of using a broadcast server for broadcasting said desired voice statements over the Internet.

* * * * *